July 24, 1928.

G. F. DAVIDSON

PNEUMATIC TIRE

Filed Oct. 11, 1924

1,678,211

Inventor
George Frederick Davidson
By B. Singer. Atty.

Patented July 24, 1928.

1,678,211

UNITED STATES PATENT OFFICE.

GEORGE FREDERICK DAVIDSON, OF SHORTLANDS, ENGLAND.

PNEUMATIC TIRE.

Application filed October 11, 1924, Serial No. 743,065, and in Great Britain January 1, 1924.

This invention relates to pneumatic tires particularly of the low pressure or "balloon" type and it has for its object to enable an increase in the width of tread to be obtained without a corresponding increase in height. A further object is to reduce the quantity of cotton required in a tire designed for a given load.

The present invention effects these objects by providing the tire with a circumferential and non-extensible zone and it may be said to consist of a pneumatic tire comprising a self supporting and floating band of non-extensible material extending circumferentially around the tire and embedded therein so as to reside between the carcass and the tread as is hereinafter more fully described and claimed.

In order that the invention may be clearly understood several embodiments of the same will now be described by aid of the accompanying drawings in, which:—

Figure 1:
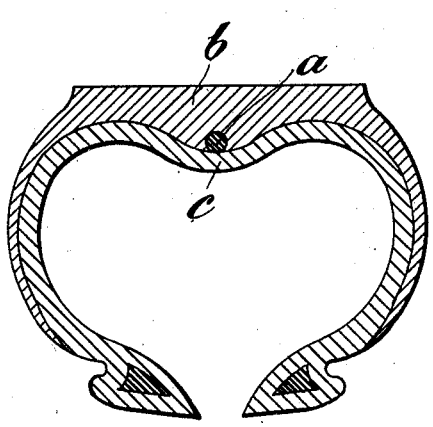
Figure 1 is a transverse section through a pneumatic tire according to one embodiment and Figures 2 and 3 are similar views of further embodiments.

Referring to Figure 1 the embodiment therein illustrated makes use of a single non-extensible and endless band $a$ consisting for example of a flexible or other metal cord or wire embedded in the tire between the outer covering of rubber or tread $b$ and the canvas $c$.

Figure 2:
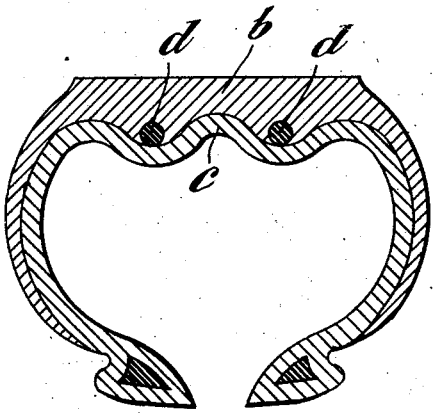

In Figure 2 is shewn the use of two of such cords or wires which are indicated at $d$.

Figure 3:
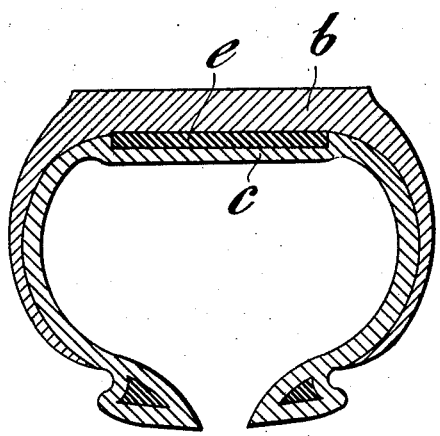

In Figure 3 is shewn a single endless band or strip of metal $e$ of nearly the same width as the tread of the tire which is embedded in the tire similarly to the cords or wires in the previous examples and performing the same function.

Figure 4:
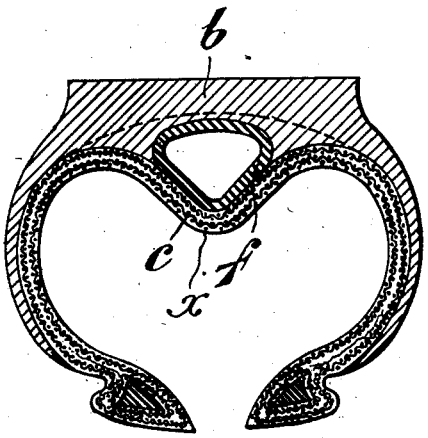
Figure 4 is a similar view of another embodiment of this invention.

In the embodiment of the invention shown in Figure 4, the two side walls are integral with the tread $b$ and the means for supporting the side walls when the tire is under load comprises a rigid self-supporting and floating tubular band $f$ of substantially triangular cross section which is embedded in the tire so as to reside between the textile carcass and the tread with its base opposing the tread and its apex serving to deform the textile carcass inward to the air space of the tire. When the tire is deflated the portion $x$ will rest on the rim between the beads and will keep the side walls from cutting.

The bands or cords may be of any material. They may be rigid and act as floating rings or flexible and bend as the tire contacts with the road.

The invention is applicable to pneumatic tires of all kinds whether beaded edge, straight side or wired on.

By applying this invention the effective diameter of the cross section of the casing is reduced and greater air pressure can therefore be used with the same thickness of cotton fabric that is to say greater loads can be carried. Or, if the same load is to be carried less cotton is required. Also the tread can be made flatter and wider which also allows greater loads to be carried but chiefly results in increased life as the tread can be worn out more uniformly and not mostly in the centre as at present. Or, for the same life less rubber may be required.

What I claim and desire to secure by Letters Patent is:—

A pneumatic tire comprising in combination a tread, a textile carcass two side walls integral with said tread and means for supporting said side walls when the tire is under load, comprising a rigid self-supporting and floating tubular band of substantially triangular cross-section embedded in the tire so as to reside between the textile carcass and the tread with its base opposing the tread and its apex serving to deform the textile carcass inwards to the air space of the tire.

In witness whereof I affix my signature.

GEORGE FREDERICK DAVIDSON.